(12) United States Patent
Theobald (10) Patent No.: US 9,623,560 B1
(45) Date of Patent: Apr. 18, 2017

(54) METHODS OF OPERATING A MECHANISM AND SYSTEMS RELATED THEREWITH

(71) Applicant: Daniel Theobald, Somerville, MA (US)

(72) Inventor: Daniel Theobald, Somerville, MA (US)

( * ) Notice: Subject to any disclaimer, the term of this patent is extended or adjusted under 35 U.S.C. 154(b) by 0 days.

(21) Appl. No.: 14/554,309

(22) Filed: Nov. 26, 2014

(51) Int. Cl.
*G05B 19/04* (2006.01)
*B25J 9/16* (2006.01)

(52) U.S. Cl.
CPC ............ *B25J 9/1676* (2013.01); *Y10S 901/01* (2013.01); *Y10S 901/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,239,246 A * | 8/1993 | Kim | ...................... | B25J 9/1633 318/560 |
| 7,873,438 B2 * | 1/2011 | Sekiya | ................... | B25J 19/023 700/245 |
| 7,890,235 B2 * | 2/2011 | Self | ......................... | G01S 3/143 340/539.1 |
| 8,374,721 B2 * | 2/2013 | Halloran | ................... | A47L 5/30 318/568.1 |
| 8,380,350 B2 * | 2/2013 | Ozick | ...................... | A47L 5/30 700/250 |
| 8,807,614 B2 * | 8/2014 | Xu | ..................... | A01G 23/0955 180/8.6 |
| 8,849,452 B2 * | 9/2014 | Takeda | ................. | B62D 57/032 318/567 |
| 9,043,025 B2 * | 5/2015 | Brooks | .................. | B25J 9/1676 700/245 |
| 2005/0107934 A1 * | 5/2005 | Gudat | ................... | G01S 5/0072 701/50 |
| 2006/0069507 A1 * | 3/2006 | Kokubo | ............... | G05D 1/0272 701/301 |
| 2006/0140450 A1 * | 6/2006 | Hong | ................. | G06K 9/00335 382/107 |
| 2007/0150105 A1 * | 6/2007 | Orita | .................... | B62D 57/032 700/245 |
| 2007/0150106 A1 * | 6/2007 | Hashimoto | ............ | G06N 3/004 700/245 |
| 2007/0152619 A1 * | 7/2007 | Sugiyama | .............. | B25J 9/1612 318/568.12 |
| 2007/0192910 A1 * | 8/2007 | Vu | .......................... | B25J 5/007 700/245 |
| 2008/0009967 A1 * | 1/2008 | Bruemmer | ........... | G05D 1/0088 700/245 |
| 2008/0086236 A1 * | 4/2008 | Saito | ..................... | G01S 5/0252 700/245 |
| 2008/0161970 A1 * | 7/2008 | Adachi | .................. | B25J 9/0003 700/253 |

(Continued)

*Primary Examiner* — Jonathan L Sample
(74) *Attorney, Agent, or Firm* — Albert J. Brunett (57) ABSTRACT

Methods and systems for operating at least one entity are provided. In one method, at least one entity is provided for operation in at least one area, where the area includes at least one human. Information is gathered regarding the human, where the information includes a location of at least one body portion of the human. It is determined whether or not the entity will contact the body portion of the human. The method also includes operating the entity to avoid contacting the body portion of the human so that the human is at least more likely to be safe from contact with the entity.

1 Claim, 6 Drawing Sheets

(56) References Cited

U.S. PATENT DOCUMENTS

| | | | | |
|---|---|---|---|---|
| 2008/0231221 A1* | 9/2008 | Ogawa | ............... | B25J 5/007 318/568.12 |
| 2009/0052740 A1* | 2/2009 | Sonoura | ............... | G06K 9/32 382/103 |
| 2010/0036556 A1* | 2/2010 | Na | ............... | G05D 1/0212 701/26 |
| 2010/0222925 A1* | 9/2010 | Anezaki | ............... | G05D 1/0221 700/253 |
| 2010/0222954 A1* | 9/2010 | Ichinose | ............... | G05D 1/024 701/26 |
| 2010/0256812 A1* | 10/2010 | Tsusaka | ............... | A47L 9/24 700/254 |
| 2011/0015785 A1* | 1/2011 | Tsusaka | ............... | B25J 9/0003 700/254 |
| 2011/0054689 A1* | 3/2011 | Nielsen | ............... | G05D 1/0088 700/258 |
| 2011/0264266 A1* | 10/2011 | Kock | ............... | B25J 9/1676 700/253 |
| 2012/0043831 A1* | 2/2012 | Sakakibara | ............... | B25J 9/1674 307/326 |
| 2012/0197439 A1* | 8/2012 | Wang | ............... | B25J 9/1689 700/259 |
| 2012/0239191 A1* | 9/2012 | Versteeg | ............... | G06N 3/004 700/246 |
| 2012/0328395 A1* | 12/2012 | Jacobsen | ............... | B25J 3/04 414/1 |
| 2013/0184980 A1* | 7/2013 | Ichikawa | ............... | B25J 9/1676 701/301 |
| 2013/0218395 A1* | 8/2013 | Kim | ............... | G05D 1/0246 701/23 |
| 2014/0005827 A1* | 1/2014 | Ogawa | ............... | B25J 9/1674 700/250 |
| 2014/0067121 A1* | 3/2014 | Brooks | ............... | B25J 9/1676 700/255 |
| 2014/0207282 A1* | 7/2014 | Angle | ............... | H04L 12/282 700/257 |
| 2014/0288703 A1* | 9/2014 | Takagi | ............... | B25J 9/1633 700/245 |
| 2015/0049911 A1* | 2/2015 | Doettling | ............... | F16P 3/142 382/103 |
| 2015/0081096 A1* | 3/2015 | Shiraki | ............... | B25J 9/101 700/255 |
| 2015/0217455 A1* | 8/2015 | Kikkeri | ............... | B25J 9/1676 700/259 |

* cited by examiner

METHODS OF OPERATING A MECHANISM AND SYSTEMS RELATED THEREWITH

BACKGROUND OF THE INVENTION

Field of the Invention

The present invention generally relates to methods and systems for operating at least one mechanism or entity and, more particularly, to methods and systems for operating at least one mechanism or entity where one or more objects may interfere with the operation of the mechanism or entity.

Background Information

Mechanisms or entities such as robots or the like have increasingly been used to perform certain tasks in a variety of areas. Often times, however, these entities may collide with or otherwise contact other objects, for example body portions of humans, which collisions are undesirable and potentially dangerous.

SUMMARY OF THE INVENTION

Methods and systems for operating at least one entity are provided. In one method, at least one entity is provided for operation in at least one area, where the area includes at least one human. Information is gathered regarding the human, where the information includes a location of at least one body portion of the human. Whether or not the entity will contact the body portion of the human is determined. The method also includes operating or otherwise having the entity avoid contacting the body portion of the human so that the human is at least more likely to be safe from contact with the entity.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention is generally related to a method and system for operating at least one mechanism or entity to avoid contact between the entity and another human or non-human object. When used with a human or other animal, an aspect of the invention relates to avoiding contact with a body portion thereof such as an appendage or the like.

In the context of this invention, the term "appendage" or "body portion" may refer to an animal or person's arm, leg, hand, foot, head, finger, or the like (hereinafter "body portion"). In the context of the invention, the term "entity" may refer to any type of mechanism including a mobile robot, a robotic arm member (such as one configured as part of a mobile robot), industrial machinery devices such as machine presses, dies, molds, mills, drills, forges, rollers, irons, conveyor belts or the like (hereinafter "entity").

Although the invention is described for use with regard to avoiding contact with an animal or the like, it is to be understood that avoiding contact with any type of object is contemplated by the present invention. For example, a misplaced tool, box or other item may interfere with the operation of the mechanism or entity and the entity needs to autonomously avoid contact with that object while still continuing on one or more tasks it is designed to perform.

As discussed in more detail below, in accordance with the present invention there are multiple ways to gather information regarding a human and their body portions. For example, sensor devices may be configured as part of the entity or located remotely from the entity to gather the information. Or, humans may wear devices on portions of their body that are substantially indicative of where their body portions are located.

The features of the present invention may be beneficial in a variety of applications. Specifically, the features of the present invention may be used in any application where entities are used to perform some task in which a person may be present.

For example, in warehouse environments, items are often required to be moved to and from various locations. It has become increasingly common for these types of tasks to be completed at least partially by robots. Often times, these robots may work in tandem with or otherwise encounter humans when completing these tasks.

The features of the present invention may also be used in the field of healthcare. Robots may be used to transfer medicine, clothing, linens, equipment, supplies or the like to various locations throughout a healthcare facility. Or, in robot-assisted surgery, robots may work in tandem with medical personnel and it may be imperative to avoid unwanted contact between the robot and the medical personnel and/or unwanted contact between the robot and the patient.

Industrial machinery devices such as those mentioned previously may severely injure a person where the machinery contacts a person during operation. People at risk of being injured by these types of machinery devices may include machine operators, facility employees, and even non-employees (e.g., facility visitors touring the facility).

Other applications that may benefit from the features of the invention may include educational facilities, airports, hospitality resorts, stadiums, arenas, restaurants, bus stations, train stations, government buildings, assembly plants, manufacturing facilities, or in any other application in which entities may be used to accomplish various tasks. The above list is non-exhaustive and a variety of other applications are contemplated that may benefit from the features of the invention.

By having the entity take steps to avoid contacting people, people don't need to worry about taking action themselves. Rather, people can continue to move, relax, or otherwise perform their own tasks while the entity or entities perform the necessary steps to make sure contact is avoided.

Figure 1:
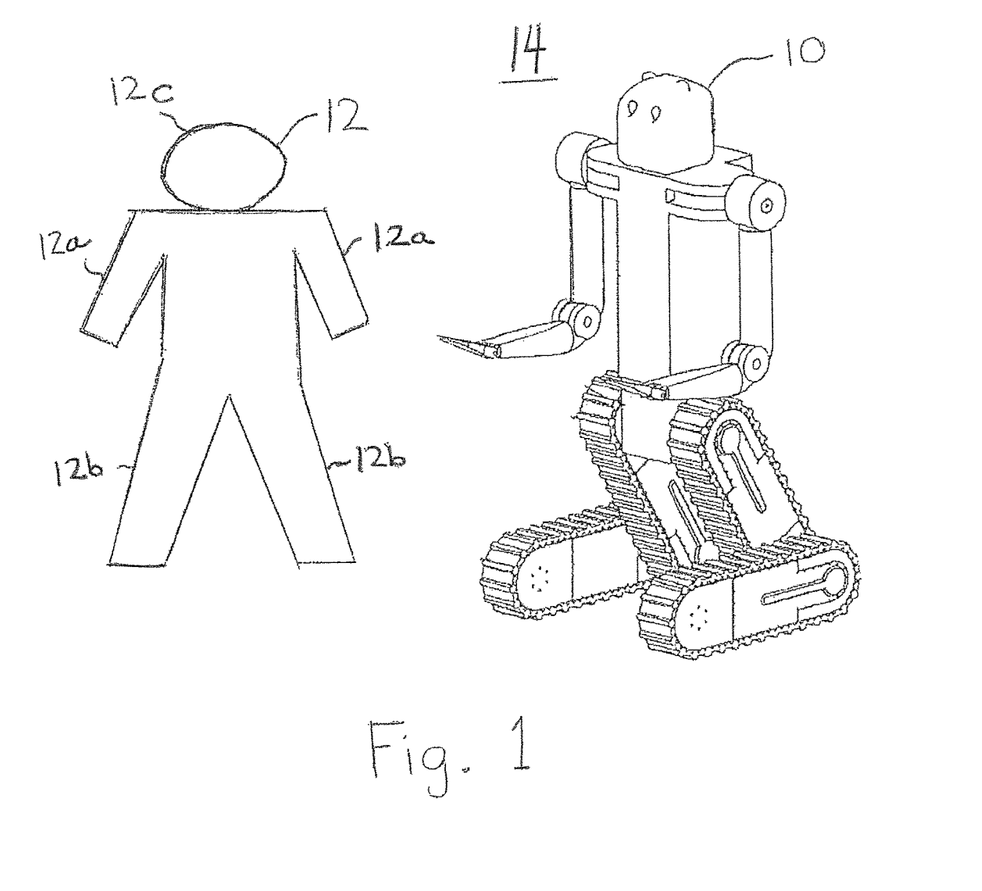
FIG. 1 generally illustrates an entity and a human in accordance with one embodiment of the invention.

FIG. 1 generally illustrates an entity (illustrated as a robot 10) near a human 12 in an area 14 in accordance with one embodiment of the invention. Briefly, in operation, the robot 10 (and the human 12) may be operating within the area 14 to complete one or more assigned tasks. Based on a number of factors, such as the robot's planned path (trajectory), the speed of the robot, the location of the human's body portions 12a-c, the movement patterns of the human, the speed of the human or the like, the human 12 may be at risk of unwanted contact with the robot 10.

If the robot 10 will (or will likely) collide with or otherwise contact a body portion of the human 12, the robot 10 may perform some activity to make sure contact with the body portion is avoided. For example, the robot 10 may come to a complete stop or the robot 10 may essentially "steer around" or otherwise adjust its planned path to make sure contact is avoided.

The robot 10 may be configured as an autonomous mobile robot that performs one or more tasks without continuous outside control and/or intervention. The robot 10, for example, may receive instructions to perform a certain task such as delivering an item or items. The robot 10 may also autonomously adapt to unknown, new and/or changing operating environments, such as the presence/movement of a human, without additional outside control and/or intervention.

The term "fully autonomous" may be used to describe a robot that performs one or more tasks without, for example, any outside control and/or intervention. A fully autonomous robot, for example, may perform a task without receiving instructions (e.g., vectors, commands, etc.) from a human operator and may avoid contact with humans when performing the task.

The robot 10 may also be semi-autonomous during performance of one or more tasks. For example, the robot 10 may also or alternatively be controlled by a remote operator.

If the robot 10 is controlled by a remote operator, the robot 10 may include a control device to essentially "override" the remote operator's control commands. For example, an operator may be controlling the robot 10 remotely and may be unaware of people in the vicinity of the robot 10. If the robot 10 is at risk of contacting a human, the robot 10 may come to a stop or otherwise adjust its planned path to avoid contacting the human, notwithstanding the remote operator's control commands.

Figure 2:
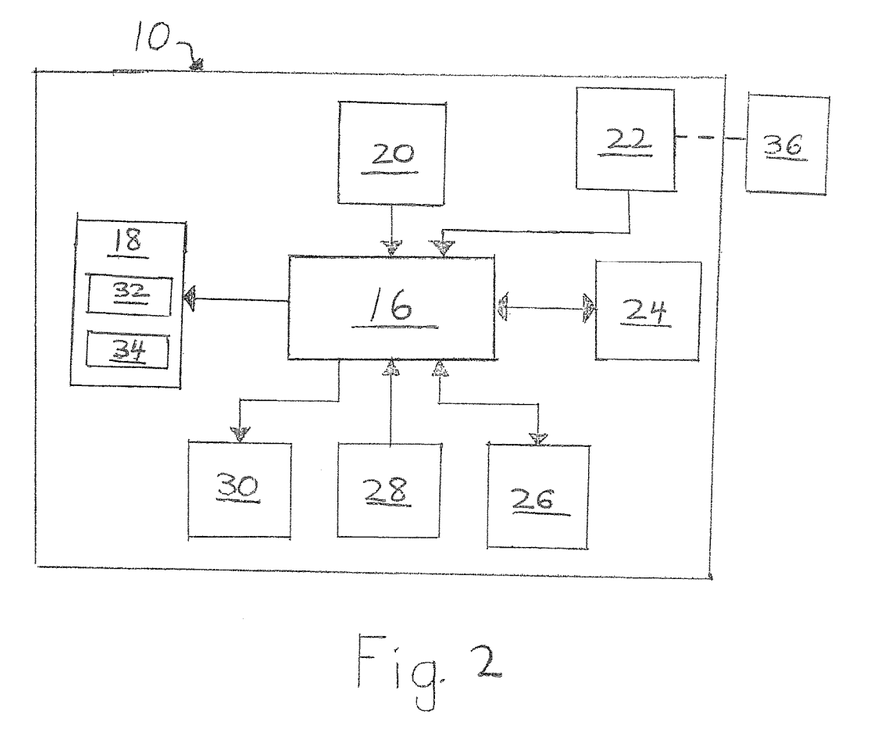
FIG. 2 generally illustrates a block diagram of a robot in accordance with one embodiment of the invention.

FIG. 2 generally illustrates a block diagram of an entity such as the robot 10 in accordance with one embodiment of the invention. The robot 10 may include a control device 16 implemented using hardware or a combination of hardware and software to perform any necessary calculations and to control operation of the robot 10. The control device 16 may include one or more processing devices, analog and/or digital circuitry, and be in operable communication with other components such as a manipulator system 18, sensor system 20, receiver element 22, memory 24, interface 26, power source 28, and a mobility platform 30.

The manipulator system 18 may be configured to interact with or otherwise manipulate items in the environment. The manipulator system 18 may include at least one arm member 32 and may also be configured with an end effector 34 such as a hand member or other gripping device such as a suction device, an electromagnet, or any other device whether available now or invented hereafter.

The sensor system 20 may include any type of sensor device that can gather information regarding the area surrounding the robot 10, namely, information regarding the presence, location, and movement of humans and their body portions. For example, the sensor system 20 may include cameras such as those described in detail in applicant's allowed patent application Ser. No. 12/626,990, entitled "System for Providing Camera Views", the disclosure of which is hereby incorporated herein by reference in its entirety.

The sensor system 20 may also include global positioning system (GPS) sensors, 3D cameras (e.g., LIDAR), infrared cameras, stereoscopic cameras, inertial sensors, odometric sensors, radar, electro-acoustic transducers (microphones), and/or other types of devices that assist the robot 10 in surveying and navigating within its environment to avoid contacting humans and their body portions. The number of, type of, and positions of the sensor devices of the sensor system 20 may vary as long as the features of the invention can be accomplished.

The sensor devices may also be positioned remotely from the robot 10. For example, one or more of the sensor devices may be operably positioned throughout an area (e.g., such as on shelves in a warehouse, if applicable). These remote sensors may gather information regarding the presence and movement of body portions in an area, which may then be communicated to the receiver element 22 via a central control device 36.

The receiver element 22 may receive commands regarding the robot's operation via a wireless connection from the central control device 36. Similarly, the receiver element 22 may receive information related to the locations of human body portions from wearable sensor devices (discussed below), or may simply receive information gathered by other remotely-positioned sensor devices.

The memory 24 may be configured to store software such as instructions for execution by the control device 16. The memory 24 may include volatile and/or non-volatile memory, and may also be configured to store information regarding the robot's surrounding area such as where humans are commonly located or the like.

The interface 26 may be used and configured to receive instructions or commands from an operator if the robot 10 is autonomous or semi-autonomous, for example. The interface 26 may include an input/output (I/O) device such as a display screen or a touch pad, in which an operator may input task assignments and/or instructions regarding whether the robot 10 should merely steer around a detected human to avoid contact with human body portions or to stop moving entirely.

The power source 28 may be configured to supply power to the control device 16 and other components of the robot 10. The power source 28 may include, for example, a battery or a series of batteries, rechargeable batteries, battery packs, or the like.

The mobility platform 30 enables movement of the robot 10. The mobility platform may include sets of wheels, motorized track portions, or the like, and may depend on the configuration of the robot 10.

Figure 3:
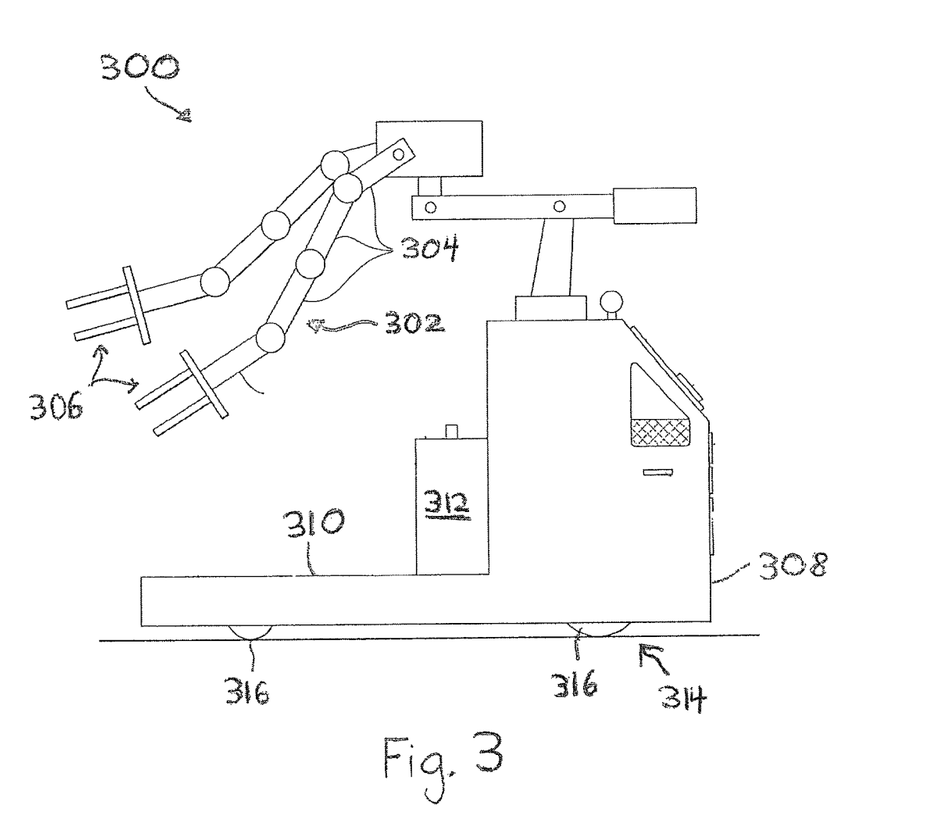
FIG. 3 generally illustrates a side view of a robot in accordance with one embodiment of the invention.

FIG. 3 generally illustrates a side view of a robot 300 in accordance with one embodiment of the invention. In this embodiment, the robot 300 may include one or more manipulator systems 302 each with one or more arm members 304. Each manipulator system 302 may be electronically, hydraulically, pneumatically and/or mechanically actuated and may include an end effector device 306 such as a gripping device, a suction device, an electromagnet, a winch, a clasp, or the like.

If the robot 300 does include hydraulically actuated devices, for example, these devices may take advantage of the "passive compliance" technology discussed in applicant's allowed application Ser. No. 12/705,995, entitled "High Efficiency Actuator Method, System, and Apparatus," the contents of which are hereby incorporated herein by reference. This technology essentially provides robot arm members or the like with a certain amount of "give" or flexibility in the event there is contact between the robot and a person.

The robot 300 may also include a base portion 308 containing the necessary electrical components, mechanical components, connections, and control devices for the robot's operation. The base portion 308 may also include a substantially flat portion 310 for supporting an item 312 or items, and also a mobility platform 314 in the form of wheels 316 for enabling movement of the robot 300.

During operation, the robot 300 may stop or otherwise prevent movement of any portion thereof, or may "steer" to avoid contact with a human body portion. For example, the manipulator systems 302 may move to be within the "footprint" of the robot 300 to at least make contact with a human less likely and without requiring the robot 300 to stop entirely. Similarly, the robot 300 itself may steer (e.g., adjust its planned path/trajectory) to avoid contact with a human body portion.

Figure 4:
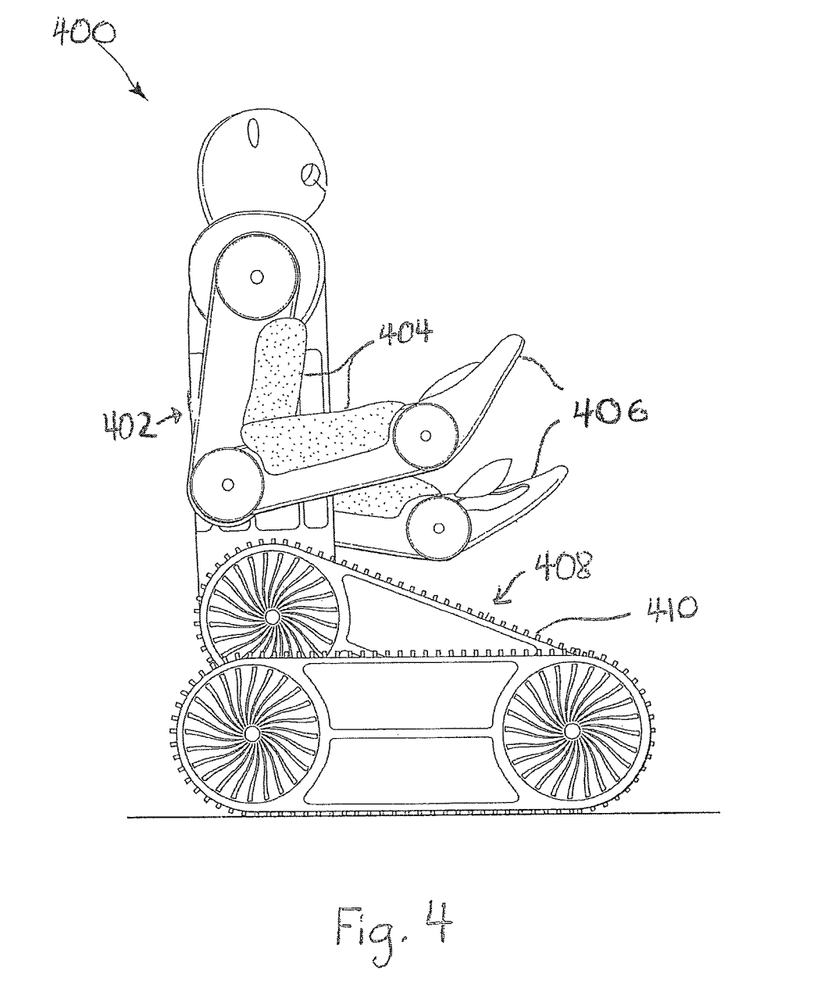
FIG. 4 generally illustrates a side view of a robot in accordance with another embodiment of the invention.

FIG. 4 generally illustrates a side view of a robot 400 in accordance with another embodiment of the invention. In this embodiment, the robot 400 may similarly include manipulator systems 402 with arm members 404. Each manipulator system 402 may be electronically, hydraulically, pneumatically and/or mechanically actuated and may include an end effector device 406 such as a gripping device, a suction device, an electromagnet, a winch, a clasp, or the like.

In this embodiment, the robot 400 may include a mobility platform 408 in the form of motorized (e.g., robotic and multi-linkage) track systems 410. The mobility platform 408 (or 314 of FIG. 3) may also or alternatively include one or more propulsion devices with configurations other than those described above and illustrated in the drawings.

To gather information regarding the presence, location, and movement of people and their body portions, the entities such as the robots discussed previously may, in one embodiment, rely on applicant's advanced computer vision and analysis tools. These tools may include those described in applicant's pending application Ser. No. 14/264,289 entitled, "Method of Operating a Sensor System," filed Apr. 29, 2014, the contents of which are hereby incorporated herein by reference.

For example, referring back to FIG. 2, the robot 10 or the central control device 36 may use model-free methods which may include background subtraction and motion segmentation which rely on changes (e.g., pixel differentiation) to identify regions in images that correspond to certain items such as body portions. Model-based methods may also be used, which employ off-line trained entity detectors for certain body portions as well as different appearances (e.g., due to different viewpoints, occlusion) of the body portions.

In another embodiment, humans may wear bracelet-like devices (hereinafter "wearable sensor devices") on a portion or portions of their body. For example, these wearable sensor devices may be in the form of arm bands, leg bands, patches, transmitters, beacons, or the like that are positioned on a person's body and are substantially indicative of a body portion location. These wearable sensor devices may essentially be tracking devices to track the location/movement of a corresponding body portion so the entity can operate accordingly without needing to rely on advanced computer vision and analysis tools.

Figure 5:
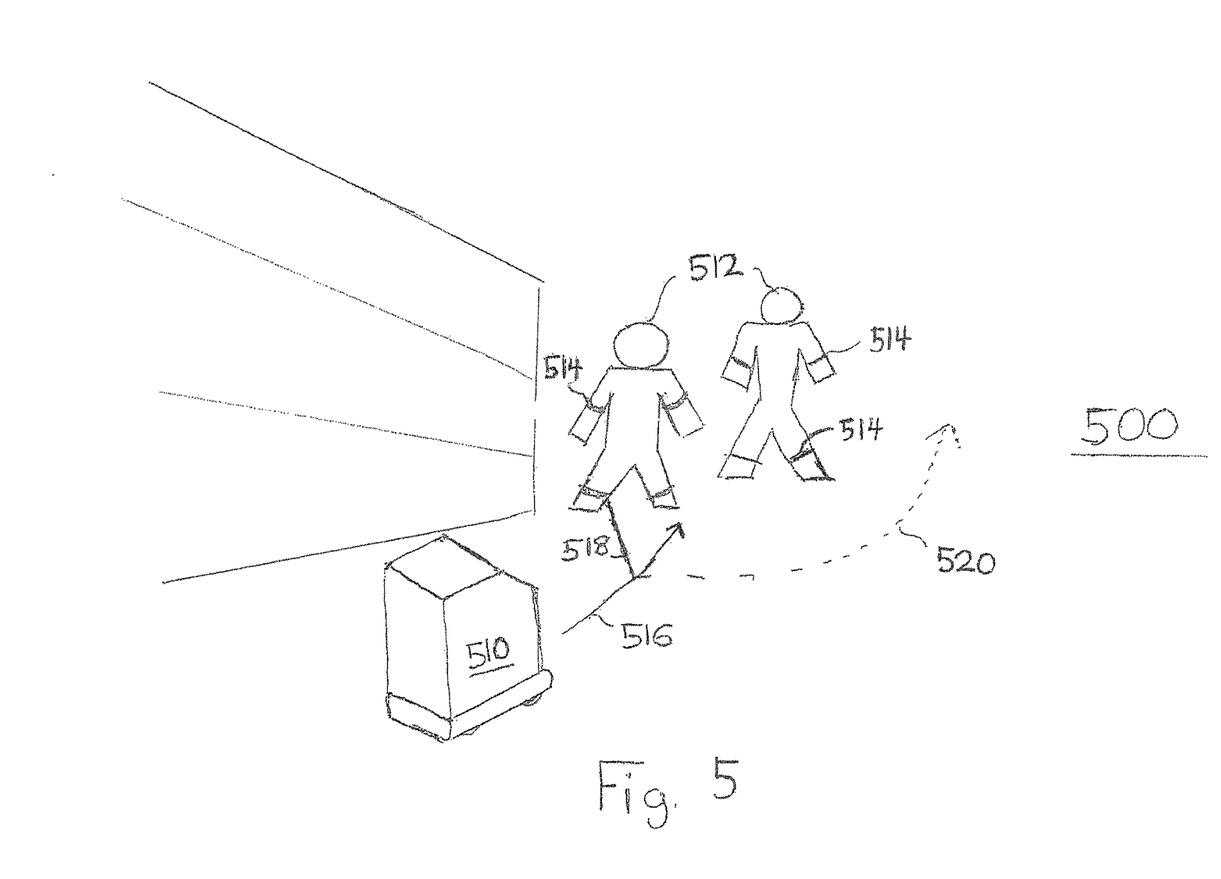
FIG. 5 generally illustrates a robot and humans in an area, where the humans are wearing wearable sensor devices in accordance with one embodiment of the invention.

FIG. 5 generally illustrates this embodiment and shows an area 500 including an entity (illustrated as a robot 510) and humans 512. The humans 512 are generally illustrated with a plurality of wearable sensor devices 514 positioned on their arms and legs. However, the robot 510 may also rely on the computer vision tools discussed previously.

When operating in this area 500, the robot 510 may have a planned path or trajectory to follow, illustrated by solid line 516. If body portions are detected, the robot may perform some activity to avoid contact. The robot 510 may, for example, stop moving entirely and wait until the humans 512 are at some predetermined distance 518 from the robot 510 before moving, or the robot 510 may adjust its planned trajectory to instead follow a new trajectory, illustrated by dashed line 520.

As briefly mentioned in the previous paragraph, the entities may be configured to perform some activity to avoid contact once the body portion and the entity are within a predetermined distance 518 from each other. The actual distance may of course vary and may also depend on the specific people in the area (e.g., the predetermined distance may be greater for small children than for grown adults). Once the portion of the human is outside of the predetermined distance, the entity may operate or move accordingly.

As stated previously, the features of the invention are of course not limited to mobile robots. Rather, the features of the invention may also be implemented in conjunction with other types of entities such as industrial machinery devices, including those mentioned previously.

Figure 6:
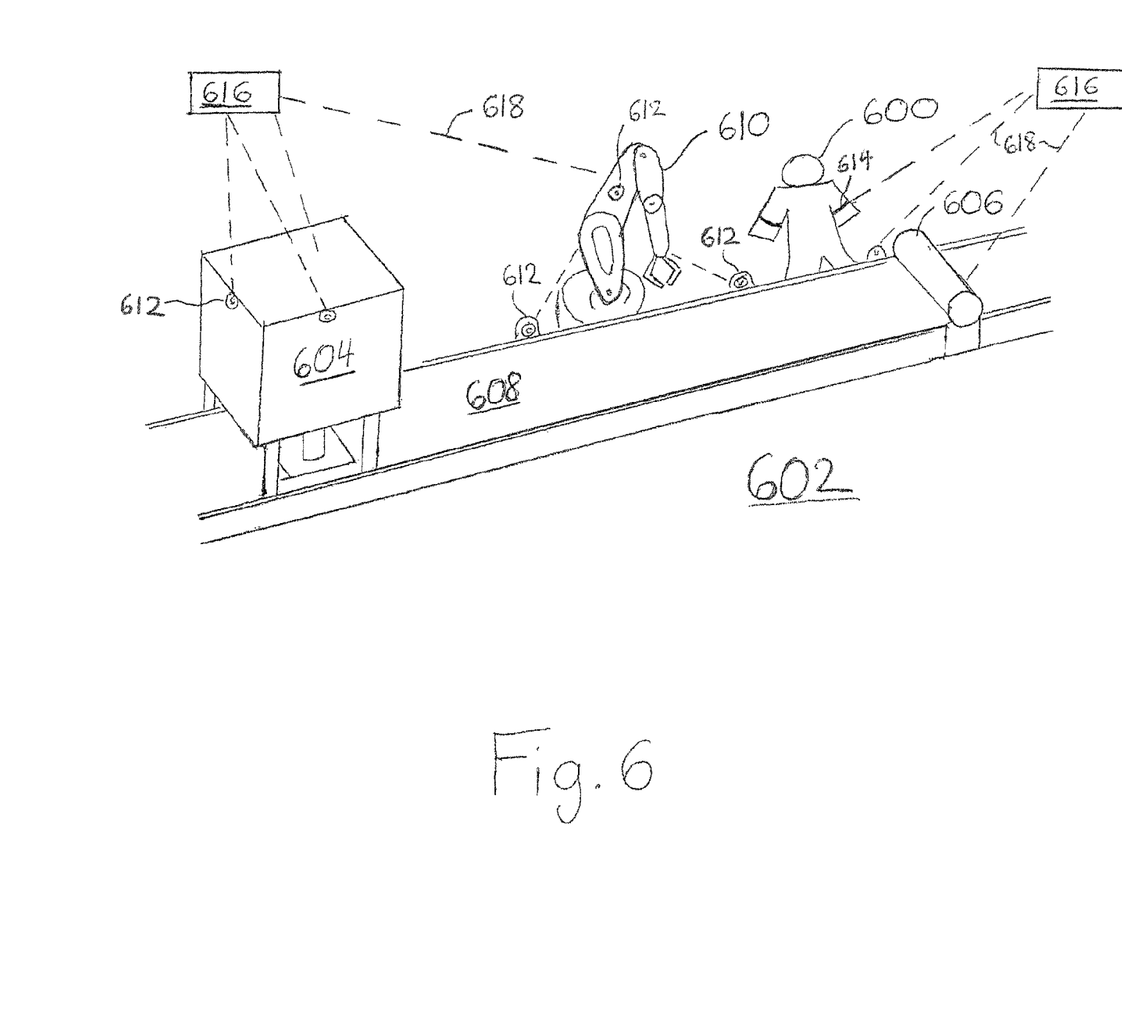
FIG. 6 generally illustrates a human in area with a plurality of entities in accordance with one embodiment of the invention.

FIG. 6, for example, generally illustrates a person 600 in an area 602 with industrial machinery device entities such as a press 604, a roller 606, a conveyor belt 608, and a robotic arm member 610. This area 602 may be in a manufacturing facility, for example, in which employees or visitors may often be in the vicinity of the entities 604-610.

Sensor devices such as those discussed previously may be located at various positions in the area 602 to gather information regarding the person 600 such as body portion locations. These sensor devices 612 may be positioned on or otherwise near each entity to detect when the person 600 is near the entity. Similarly, the person 600 may also use wearable sensor devices 614 as discussed previously.

The sensor devices 612 and 614 and the entities 604-610 may be in operable communication with at least one central control device 616. The control device 616 may receive and analyze information from the sensor devices 612 and 614 and instruct the entities 604-610 accordingly. For example, the entities 604-610 may include on-board receiver and control elements (not shown) to receive instructions and to control operation of the entity.

Communication between the sensor devices 612 and 614, the control device 616, and the entities 604-610 may be made by any suitable connection, such as a wireless connection as illustrated by dashed lines 618. Similarly, it is contemplated that a central control device 616 may not even be needed with direct communication between sensor devices 612 and 614 and the entities, as long as the information from the sensor devices 612 and 614 can be analyzed and the entities can operate accordingly (e.g., by on-board control elements of each entity).

If the person 600 is at risk of being contacted by an entity 604-610, the entity may essentially stop moving or otherwise stop operating. For example, if the person's arm is positioned between the press 604 and the conveyor belt 608, the press 604 and the conveyor belt 608 may stop operating until the person's arm is removed.

If the person 600 is near the robotic arm member 610, the arm member 610 may similarly stop moving. Or, the arm member 610 may continue to move/operate, but may adjust its planned movement to avoid contacting the person 600, if possible.

It is also contemplated that the features discussed in the instant application are not limited to avoiding contact with human body portions. For example, the features of the invention may be incorporated into other types of entities and also used to avoid contact with animals, other robots, equipment, machinery, and other objects or the like.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

What is claimed is:

1. A method of operating a mobile robot comprising:
   providing a mobile robot capable of locomotion for operation in an area along with at least one human, the mobile robot at least including a control device and a sensor system wherein the mobile robot is a fully autonomous robot that provides its own locomotion and operates independently within an area without interference from any humans, wherein the mobile robot further includes an arm member and the control device operates both the mobile robot and the arm member to avoid contacting the appendage of the human including revising the operation of both the mobile robot and the arm member to avoid contacting the appendage while continuing to enable the mobile robot and the arm member to operate as desired and accomplish one or more tasks, the arm member further including components that provide passive compliance to the arm member if contact is made between the arm member and a human, an appendage of a human or an item and the arm member provides a desired amount of give or flexibility to reduce or eliminate any injury to a human or damage to an item;
   operating the mobile robot via the control device within the area to at least accomplish one or more tasks;
   gathering information via the sensor system regarding the location of at least one appendage of the human;
   determining via the control device whether the mobile robot will contact the appendage of the human as the mobile robot is moving within the area to accomplish its task; and
   operating the mobile robot via the control device to avoid contacting the appendage of the human including revising the operation or movement of the mobile robot if needed to avoid contacting the appendage while continuing to enable the mobile robot to operate as desired and accomplish one or more tasks.

* * * * *